Jan. 3, 1933.  H. K. KOUYOUMJIAN  1,893,289
ELECTRIC CONTROLLING APPARATUS
Filed June 15, 1929  2 Sheets-Sheet 1

INVENTOR
Haroutiun K. Kouyoumjian
BY
Lawrence K. Sager
ATTORNEY

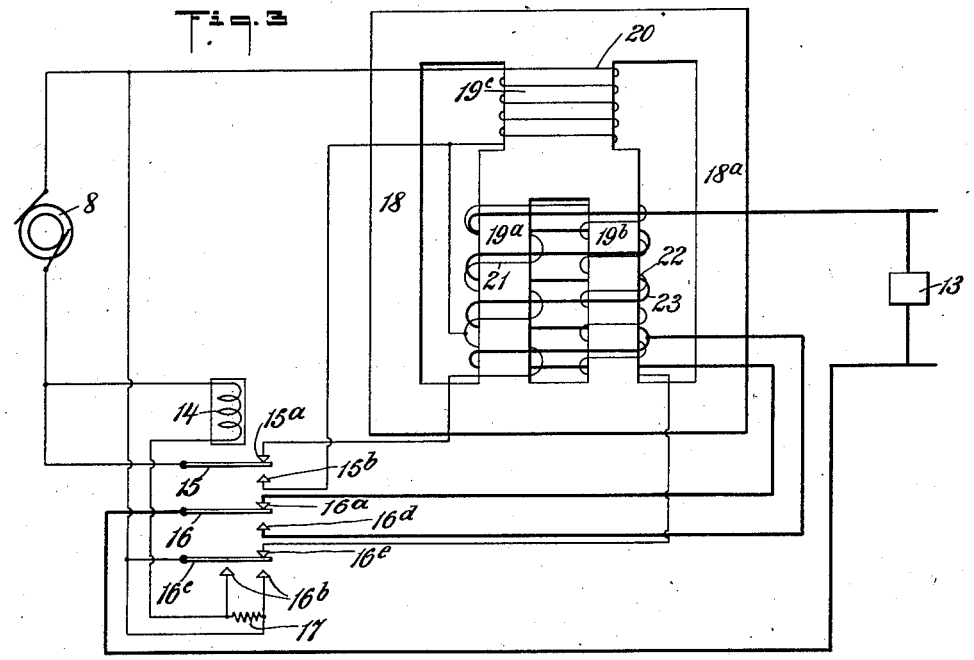
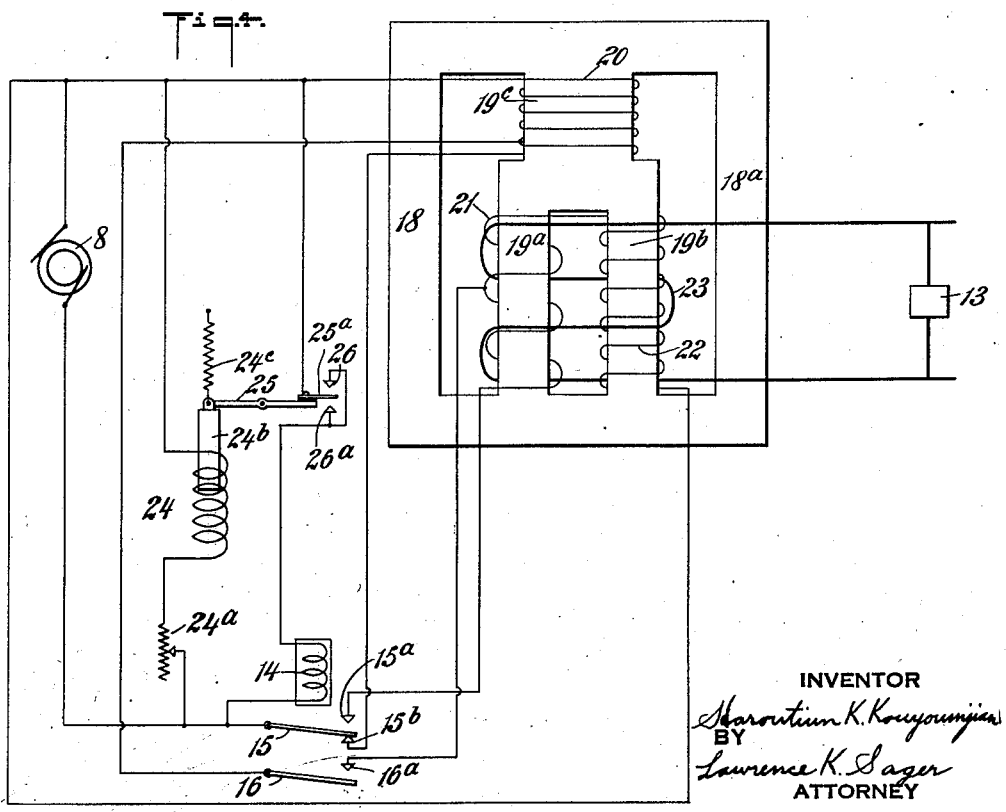

Patented Jan. 3, 1933

1,893,289

UNITED STATES PATENT OFFICE

HAROUTIUN K. KOUYOUMJIAN, OF PROVIDENCE, RHODE ISLAND, ASSIGNOR TO WARD LEONARD ELECTRIC COMPANY, A CORPORATION OF NEW YORK

ELECTRIC CONTROLLING APPARATUS

Application filed June 15, 1929. Serial No. 371,186.

This invention relates to the control of alternating current energy, and particularly relates to apparatus and regulating means whereby the voltage delivered to the consumption circuit is regulated to maintain a substantially constant voltage thereon, regardless of variations in the supply voltage, or as may otherwise be desired, and also to means for increasing the efficiency of the apparatus when the conditions are such that the special regulating effect is unnecessary.

This invention is an improvement over the inventions disclosed and claimed in my pending applications Serial Number 306,259, filed September 15, 1928, and Serial Number 344,333, filed March 5, 1929, which disclose improved regulating and transforming apparatus.

There are many instances, especially where the energy controlled is considerable in amount, where, within certain limits, it is unnecessary to regulate or control the voltage, because the supply voltage may remain within acceptable limits during a considerable period and render the utilization of special regulating means unnecessary. During such periods, the apparatus, in accordance with the present invention, is enabled to operate at maximum efficiency; but, when the supply voltage, or other controlling factor, passes beyond certain limits, it is desirable to introduce the special regulating action in order to avoid undesirable variations in the voltage of the consumption circuit or circuits.

The main object of the present invention is to provide apparatus which will secure the advantageous control and regulation of the energy as above explained and serve to obtain maximum efficiency and control of the electric energy, while also having the advantage of voltage control when the same is desired. Another object is to secure these advantages in a form of apparatus which will be dependable in operation and economical in cost by avoiding expensive auxiliary controlling apparatus and likewise permitting the use of the main apparatus under all conditions and avoiding the use of duplication of apparatus. Other objects and advantages will be understood from the following description and accompanying drawings.

Figure 1:
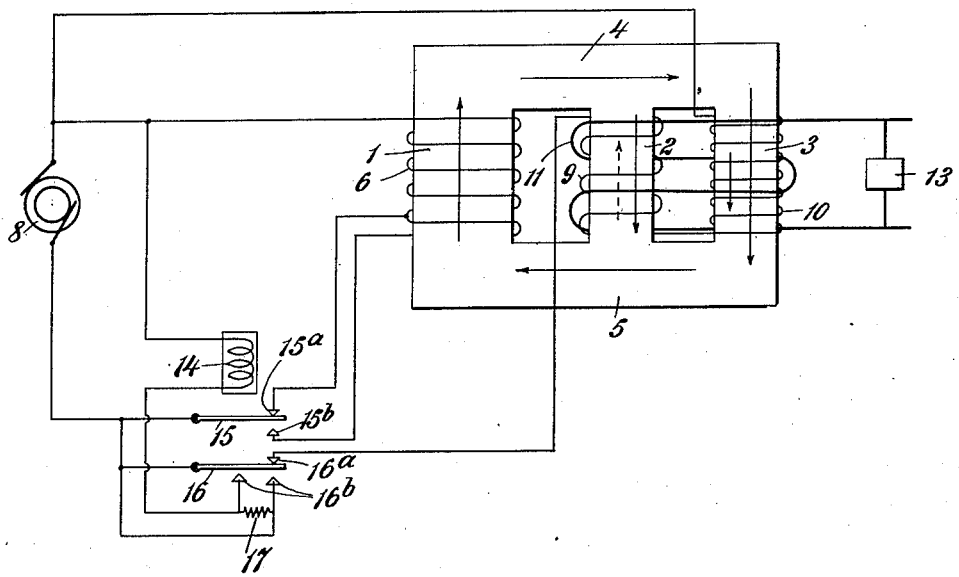
Figure 2:
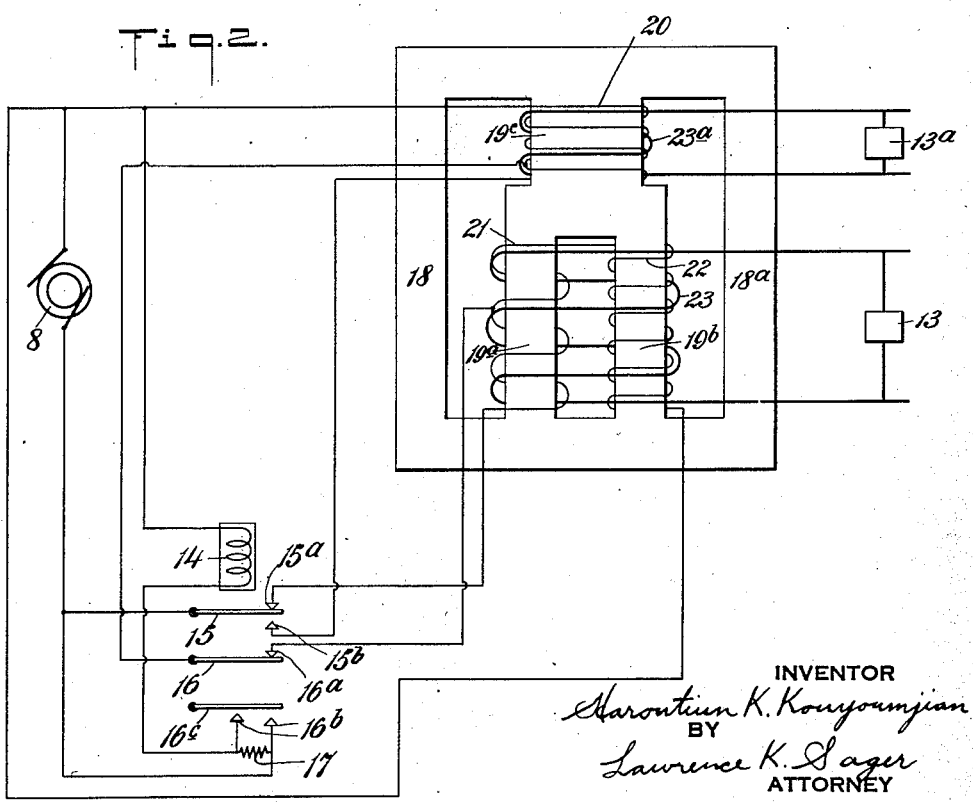

Fig. 1 is a diagram illustrating one embodiment of this invention; and Figs. 2, 3 and 4 are diagrams illustrating various other embodiments of the invention.

Referring to Fig. 1, the transforming and regulating apparatus is indicated as a core, laminated in the usual manner and having three parallel legs 1, 2 and 3 connected together by an upper crosspiece 4 and a lower crosspiece 5. The leg 1, in this instance, is the main leg and adapted to carry the main flux of the transformer. The cross-section of the legs 2 and 3 is usually about the same and each of these legs ordinarily has a cross-section of about half of that of the leg 1.

The leg 1 is enveloped by an alternating current winding 6 which derives its energy from the alternating current source 8. The leg 2 carries an alternating current winding 9 connected in series with another winding 10 around the leg 3 and the two coils are connected across the source of supply 8. In some instances, the windings 9 and 10 may be connected in parallel with each other to the source. The direction of the windings 9 and 10 with reference to each other is such as to act cumulatively with reference to the excitation of the legs 2 and 3; consequently, the direction of the magnetic flux due to the winding 10 will be additive to the flux due to the winding 1, whereas the flux due to the winding 9 will tend to oppose that due to the winding 1. Considering one instant of operation, the direction of the main flux due to widing 6 is indicated by the long full line arrows, the direction of the flux due to winding 10 is indicated by the short full line arrow and the direction of the flux tending to be set up by the winding 9 is indicated by the short dotted line arrow.

The output, or secondary, winding 11 is shown enveloping both of the legs 2 and 3 and supplies the consumption circuit and the translating device or devices indicated at 13.

The controlling relay or magnet is shown having a voltage coil 14 connected across the source 8 and controls the pivoted armatures 15 and 16. The armatures are shown in their attracted position, at which time the armature 15 engages a contact 15a connected to a tap in the primary winding 6; and the armature 16 then engages a contact 16a which is connected to the bucking winding 9, thereby serving to connect this winding and the cumulatively acting winding 10 in circuit across the source 8 through the armature 16 when raised. When the armatures are not attracted, the armature 15 engages the contact 15b and connects the whole of the main winding 6 across the source 8 instead of a portion of said winding, as when in the attracted position of the armature 15. When the armature 16 is not attracted, it breaks the connection with contact 16a and disconnects the cumulative and bucking windings from circuit. The armature 16 when not attracted, also engages the two contacts 16b and thereby short-circuits a resistance 17 connected between these contacts. When the armature 16 is attracted, the resistance 17 is caused to be inserted in series with the coil 14 of the magnet, as shown by the connections, and when the armature 16 is not attracted, the short-circuiting of the resistance 17 permits a comparatively stronger current to pass through the magnet coil 14. This is for the purpose of increasing the sensitiveness of the magnet so that by proper proportioning and adjustment of the coil 14 and resistance 17, the armatures will be released by the magnet when the supply voltage is only slightly less than that which caused the armatures to be raised.

It will be understood that the number of turns of the windings indicated in Fig. 1 are as shown for the purpose of simplicity and clearness, and that in actual practice the number of turns and size of wire will be such as to give the particular results desired, and also be adapted to meet the particular conditions of different situations. It will also be understood, that the windings may, in some cases, be placed side by side, or sandwiched, instead of being superimposed, and that the secondary output winding may be located otherwise than as shown; and that in some cases the primary and secondary windings may both be superimposed over the cumulative and bucking windings, although in general, the closest regulation is obtained with the windings located as indicated in Fig. 1.

When the voltage of the supply circuit has attained a sufficient value to cause the armatures of the controlling magnet or relay to be attracted, the operation for securing the desired regulation will be the same as that described in my said prior applications.

For a general understanding of the same, however, it may be stated that the number of ampere turns of the windings 9 and 10 and the cross-section of the legs 2 and 3 are so related that under normal conditions these cores are worked near, or just below, the knee of the permeability or saturation curve, although in some cases, for special requirements, these cores may be worked at a different part of the saturation curve. In general, the leg having the bucking winding will be worked along the straight portion of the saturation curve below the knee and at a lower magnetic density than that of the leg having the cumulative winding.

Considering first the effect of abnormal changes in the supply voltage and the action whereby the voltage of the consumption circuit is maintained substantially constant, regardless of change in the supply voltage, it may be assumed that the supply voltage drops to an abnormally low amount. The reduced voltage would, of course, cause a reduced excitation in the leg 3, due to the lesser current passing through the cumulatively acting winding 10, but the flux in the leg 2 would be correspondingly increased, because the bucking winding 9 would receive a decreased current and have less opposing effect, the leg then being worked on the straight portion of the saturation curve, or somewhat below the knee of the curve. Thus the action of the two windings 9 and 10 in combination with the excitation due to the main winding 6 causes the resultant flux, to which the secondary 11 is subjected, to remain substantially the same.

Now suppose the supply voltage to be abnormally high; this, of course, tends to increase the total main flux due to the increased excitation, or increase of ampere turns, in the windings 6 and 10, but the increase due to the added effect of winding 10 is not proportional, because the increased flux in the leg 3 causes the excitation of the same to be such that it is carried along the bend or knee of the saturation or permeability curve. The excitation due to the winding 9, however, causes increased opposition to the main flux, and as the leg 2 is then worked along the straight portion of the permeability curve, its opposition is more effective on the main flux than is the attempted added effect due to the winding 10. Thus the resultant effect on the main flux is to prevent any objectionable increase and to prevent any substantial change in the resultant flux to which the secondary winding 11 is subjected, or any substantial change in the voltage delivered to the rectifier and to the direct current consumption circuit. In other words, regardless of variations in the voltage of the alternating current supply, the direct current output voltage is maintained substantially constant.

It will be understood that any desired control of the output voltage may be obtained by location and proportioning of the parts relatively to each other, the output voltage being caused to increase, if desired, with a decrease in the supply voltage, or to decrease with a decrease in the supply voltage, or the reverse, and likewise with increase of load, the voltage may be caused to increase or decrease and any desired results obtained to suit the particular requirements.

When the supply line voltage decreases to such value that the special control thereof becomes unnecessary, the magnet 14 permits its armatures to fall, thereby cutting the bucking and cumulatively acting windings out of circuit. At the same time the effective windings of the primary 6 are increased by the armature 15 engaging the contact 15$b$ instead of the contact 15$a$. The increased primary turns will compensate for the reduction of total flux which would otherwise take place by reason of the bucking and cumulative windings being cut out of circuit. With the armatures released, the apparatus acts as the usual transformer and at a somewhat higher efficiency than is the case when the auxiliary controlling windings are in circuit; and this action will continue as long as the supply voltage does not exceed acceptable limits.

Fig. 2 shows a modification wherein the form of the core and arrangement of the windings is quite different from that indicated in Fig. 1. In Fig. 2, the core is provided with two outer legs 18 and 18$a$ and with two inner legs 19$a$ and 19$b$ which are merged into a common leg portion 19$c$, the legs being connected by the upper and lower cross-portions of the core.

The main primary winding 20 envelops the leg portion 19$c$ and is connected from the source to the contact 15$b$ of the controlling magnet 14 so that when the armature 15 is released, the full primary winding will be connected in circuit. The bucking winding 21 is wound around the leg portion 19$a$ and is in series with the cumulative winding 22 across the supply circuit through the contact 15$a$ and armature 15 when the armatures are attracted. From a tap in the bucking winding a connection extends to the contact 16$a$, engaged by the armature 16 when attracted; and under this condition a circuit extends to a tap in the primary winding 20. Thus when the armatures are attracted, a portion of the primary winding is connected across the source in series with a portion of the bucking winding 21. This inclusion of the bucking winding, or a portion thereof, in series with the main primary winding has the advantage that upon increase in the supply voltage above normal, the tendency is to reduce the watt-less current in the main winding with resulting advantages. An additional armature 16$c$ is provided, indicated in Fig. 2, for short-circuiting the resistance 17 when not attracted and for inserting the same in circuit with the winding of the magnet 14 when attracted.

The output winding 23, supplying the translating device 13, is shown enveloping the two leg portions 19$a$ and 19$b$ and the bucking and cumulative windings. Another output winding 23$a$ is shown on the leg portion 19$c$ of the core supplying another translating device 13$a$. Additional secondary windings may be provided, if desired, for particular requirements, but the control of the voltage of the winding 23$a$ as located, will not ordinarily be as close as, or within the limits of control obtainable by locating the secondary or output winding in the position shown by the winding 23.

Fig. 3 is similar to Fig. 2, except that instead of increasing the turns of the primary winding when the voltage control is not effective, the turns of the secondary or output winding 23 are decreased. This is accomplished by a tap connection in the winding 23 extending to the contact 16$d$ and connecting the armature 16 in series with the load circuit; and also connecting a terminal of the winding 23 to the contact 16$a$ so that when the armatures are not attracted, a decreased number of turns of the secondary winding will be active in supplying the translating device 13. In this figure also the contact 16$e$ is engaged when the armature 16$c$ is attracted so that the cumulative and bucking windings are connected in circuit, when it is desired that the special voltage controlling means be availed of.

Fig. 4 is similar to Fig. 2, except that the control is such that when the supply voltage exceeds a certain limit, or falls below a certain limit, the special voltage control of the apparatus is caused to become effective; but where the supply voltage lies within an acceptable mid-range, the apparatus is caused to act as a transformer without the necessity or use of the special controlling effect.

In Fig. 4, a winding 24 is connected across the supply circuit in series with an adjustable resistance 24$a$. This coil is in the form of a solenoid and is adapted to draw a core 24$b$ within it upon increase in voltage and against the action of a spring 24$c$. A pivoted lever 25 is pivotally connected with an end of the plunger 24$b$ and carries an insulated contact 25$a$, which is electrically connected to one of the supply lines of the source 8. The control magnet 14 is here shown connected to the other supply line of the source 8, and also to the contacts 26 and 26$a$ adapted to be engaged by the movable contact 25$a$ when raised or lowered.

When the voltage exceeds a predetermined amount, the core 24$b$ is drawn within the coil 24 sufficiently to cause the contact 25$a$ to engage contact 26. This energizes the relay or magnet 14 and causes the armatures 15 and 16 to be attracted, thereby causing the apparatus to give the desired voltage control of the output circuit. When the supply voltage falls below a predetermined amount, the spring 24c overcomes the attractive force of the coil 24 and causes contact 25a to engage contact 26a, which will likewise energize the relay 14 and cause the voltage of the output circuit to be kept within desired limits, even though the supply voltage has become abnormally low. But when the supply voltage is within a range such that it does not cause the contact 25a to engage either the contact 26 or the contact 26a, then the apparatus is caused to act as a transformer without the special voltage controlling effect. Thus within a certain mid-range, the apparatus operates at a somewhat higher efficiency and the voltage of the supply and of the output winding is within a normal and acceptable amount, but when the supply voltage rises above, or falls below, this acceptable range, then the special voltage controlling effect of the apparatus is brought into action and the voltage of the output circuit maintained within acceptable limits, regardless of the abnormal voltage of the source.

Instead of having the change in supply voltage the controlling factor as to the character of operation of the apparatus, it is evident that any other variable condition may be utilized to cause the apparatus to act as a transformer, or as a transformer with the special voltage regulating control.

Although I have described and indicated preferred embodiments of my invention, it is evident that various modifications may be made without departing from the scope of the invention.

I claim:

1. The combination with a supply circuit of apparatus for supplying energy to a consumption circuit, said apparatus comprising a core and a main exciting winding thereon connected in circuit with said supply circuit, an auxiliary exciting winding on said core connected in circuit across said supply circuit for affecting the voltage delivered to said consumption circuit, and means responsive to the voltage of the supply circuit for automatically causing said auxiliary winding to be inactive when the supply voltage is within a predetermined limit.

2. The combination with a supply circuit of apparatus for supplying energy to a consumption circuit, said apparatus comprising a core and a main exciting winding thereon connected in circuit with said supply circuit, an auxiliary exciting winding on said core connected in circuit across said supply circuit and acting in opposition to said main winding for affecting the voltage delivered to said consumption circuit, and means responsive to the voltage of the supply circuit for automatically causing said auxiliary winding to be inactive when the supply voltage is within a predetermined limit.

3. The combination with a supply circuit of apparatus for supplying energy to a consumption circuit, said apparatus comprising a core and a main exciting winding thereon connected in circuit with said supply circuit, an auxiliary exciting winding on said core connected in circuit across said supply circuit and acting in opposition to said main winding for affecting the voltage delivered to said consumption circuit, and means responsive to the voltage of the supply circuit for automatically causing said auxiliary winding to be inactive when the supply voltage is within upper and lower limits.

4. The combination with a supply circuit of apparatus for supplying energy to a consumption circuit, said apparatus comprising a core and a main exciting winding thereon connected in circuit with said supply circuit, an auxiliary exciting winding on one portion of said core connected in circuit across said supply circuit and acting in opposition to said main winding and a second auxiliary exciting winding on another portion of said core connected in circuit across said supply circuit acting cumulatively with said main winding for affecting the voltage delivered to said consumption circuit, and means responsive to the voltage of the supply circuit for automatically causing said auxiliary windings to be inactive when the supply voltage is within a predetermined limit.

5. The combination with a supply circuit of a transformer, an auxiliary exciting winding on a portion of the core thereof acting in opposition to the primary winding of said transformer and connected in circuit across said supply circuit for controlling the output energy, and automatic means responsive to the voltage of the supply circuit for causing said auxiliary winding to be active, or inactive, according to change in the supply voltage.

6. The combination with a supply circuit of a transformer, an auxiliary exciting winding on a portion of the core thereof acting in opposition to the primary winding of said transformer and connected in circuit across said supply circuit for controlling the output energy, and automatic means responsive to the voltage of the supply circuit for causing said auxiliary winding to be inactive when the supply voltage is within predetermined limits.

7. The combination with a supply circuit of a transformer, an auxiliary exciting winding on a portion of the core thereof acting in opposition to the primary winding of said transformer and connected in circuit across said supply circuit for controlling the output energy, and a magnetic device responsive to the voltage of the supply circuit for automatically causing said auxiliary winding to be inactive when the supply voltage is within predetermined limits.

8. The combination with a supply circuit of a transformer, an auxiliary exciting winding on a portion of the core thereof acting in opposition to the primary winding of said transformer and connected in circuit across said supply circuit for controlling the output energy, and automatic means responsive to the voltage of the supply circuit for causing said auxiliary winding to be inactive and for changing the ratio of the active primary and secondary turns of the transformer when the voltage of the energy supplied to the transformer is within a predetermined limit.

9. The combination with a supply circuit of a transformer, an auxiliary exciting winding on one portion of the core thereof acting in opposition to the primary winding of said transformer and connected in circuit across said supply circuit, a second auxiliary winding upon another portion of said core acting cumulatively with said primary winding and connected in circuit across said supply circuit, and automatic means responsive to the voltage of the supply circuit for causing said auxiliary windings to be inactive when the voltage of the supply circuit is within a predetermined limit.

10. The combination with a supply circuit of a transformer, an auxiliary exciting winding on one portion of the core thereof acting in opposition to the primary winding of said transformer and connected in circuit across said supply circuit, a second auxiliary winding upon another portion of said core acting cumulatively with said primary winding and connected in circuit across said supply circuit, and automatic means responsive to the voltage of the supply circuit for causing said auxiliary windings to be inactive and for changing the ratio of the active primary and secondary turns of the transformer when the voltage of the supply circuit is within a predetermined limit.

11. The combination with a supply circuit of a transformer, said transformer having a core with the inner portion thereof of a forked form, the primary of said transformer being wound about the common portion of said forked form, an auxiliary exciting winding on one leg of said fork acting in opposition to the primary winding and connected in circuit across said supply circuit, a second auxiliary winding on the other leg of the fork acting cumulatively with said primary winding and connected in circuit across said supply circuit, and automatic means for causing said auxiliary windings to be inactive when the voltage of the supply circuit is within a predetermined limit.

12. The combination with a supply circuit of a transformer, said transformer having a core with the inner portion thereof of a forked form, the primary of said transformer being wound about the common portion of said forked form, an auxiliary exciting winding on one leg of said fork acting in opposition to the primary winding and connected in circuit across said supply circuit, a second auxiliary winding on the other leg of the fork acting cumulatively with said primary winding and connected in circuit across said supply circuit, and automatic means for causing said auxiliary windings to be inactive and for changing the effective ratio of the primary and secondary turns of the transformer when the voltage of the supply circuit is within a predetermined limit.

HAROUTIUN K. KOUYOUMJIAN.